United States Patent [19]

Shah et al.

[11] 4,132,114
[45] Jan. 2, 1979

[54] TEMPERATURE PROBE ASSEMBLY FOR GAS TURBINE ENGINE

[75] Inventors: Chandra C. Shah, Broomall; James A. Laurelli, Springfield, both of Pa.

[73] Assignee: Westinghouse Electric Corp., Pittsburgh, Pa.

[21] Appl. No.: 777,259

[22] Filed: Mar. 14, 1977

[51] Int. Cl.² ............................................. G01K 7/02
[52] U.S. Cl. ................................. 73/343 R; 73/359 R
[58] Field of Search .................. 73/343 R, 346, 359 R

[56] References Cited

U.S. PATENT DOCUMENTS

| | | | |
|---|---|---|---|
| 2,705,747 | 4/1955 | Strange | 73/343 R X |
| 3,061,806 | 10/1962 | Stevens | 73/359 R X |
| 3,112,790 | 12/1963 | Fredrick | 73/359 R X |
| 3,680,382 | 8/1972 | Vaiden | 73/343 R |
| 3,788,143 | 1/1974 | Gabriel | 73/346 |

Primary Examiner—Donald O. Woodiel
Attorney, Agent, or Firm—F. A. Winans

[57] ABSTRACT

A self-contained temperature probe assembly for sensing the disc cavity temperature of a gas turbine engine is shown. The assembly includes a thermocouple probe comprising an upper tube and a lower tube housing the probe leads. The lower tube extends from the cylinder housing through the blade ring to guide the probe tip through a hollow vane to adjacent a rotor disc and includes a tapered portion for sealing engagement with a tapered aperture in the blade ring as biased by a coil spring. The upper tube extends outwardly from the turbine cylinder to the probe head. The adjacent ends of the two tubes are retained in a standard flange in predetermined spaced relation against outward withdrawal and the lead wires are coiled within the space to maintain a slack condition to prevent transmission of vibration of the lead wires into the probe head and also prevent the rather fragile wires from supporting any weight of the probe during shipping or installation of the probe to the turbine.

7 Claims, 2 Drawing Figures

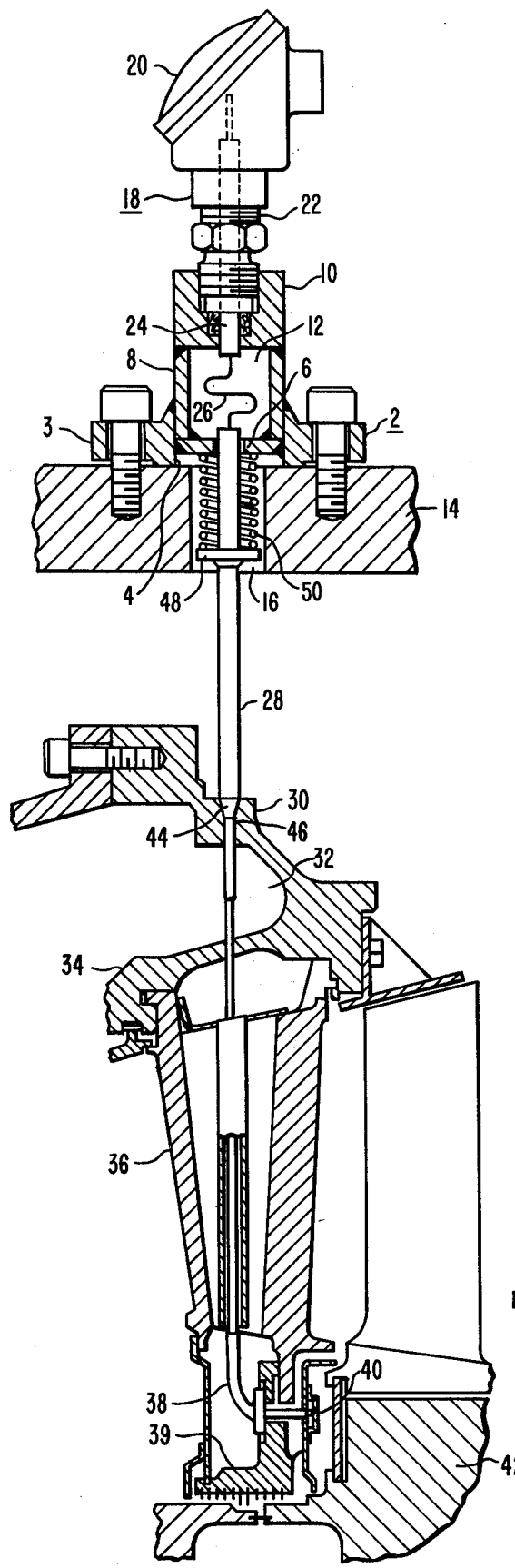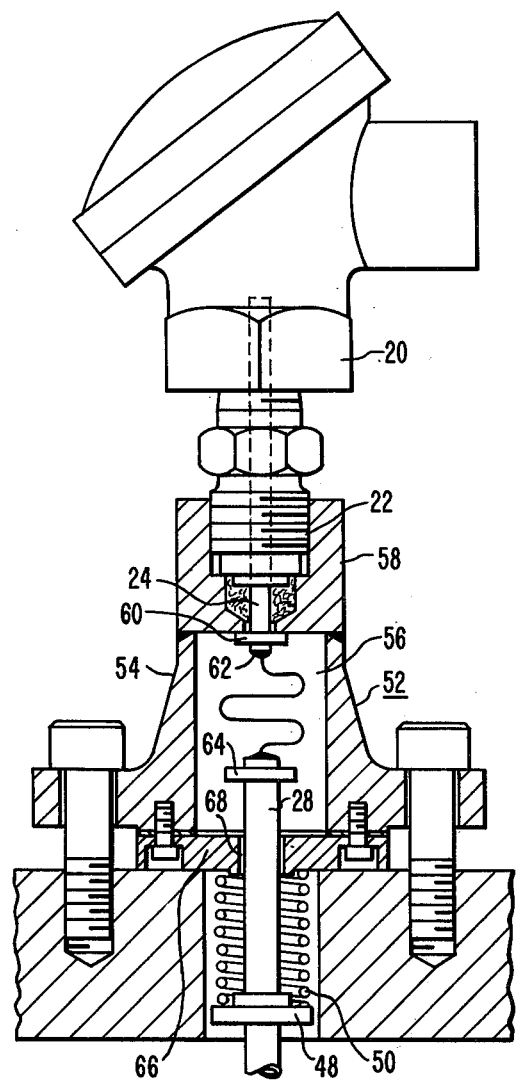
FIG. 1
PRIOR ART
FIG. 2

TEMPERATURE PROBE ASSEMBLY FOR GAS TURBINE ENGINE

BACKGROUND OF THE INVENTION

1. Field of the Invention:

The invention relates to a spring biased temperature probe for sensing the disc cavity temperature of a gas turbine engine and more particularly to a self-contained assembly of such a probe to ensure a predetermined amount of slack in the lead wires of the probe to prevent failure of the probe due to fatigue or stress on the wires and to permit a sealed engagement between the probe and an internal cylinder.

2. Description of the Prior Art

Thermocouples are generally used to measure the temperature in certain critical areas of high temperature turbo-machinery. One such area is the discs of a gas turbine engine, and, in sensing such temperature, it is common to place a temperature probe so that the thermocouple tip is disposed in the disc cavity adjacent the rotor disc.

In the gas turbine of the assignee of the present invention, the temperature probe has typically extended from the turbine cylinder inwardly through an inner cylinder defining a cooling air chamber supplying cooling air for the hollow vanes supported on a blade ring and extended further inwardly through said hollow vane to ultimately position the thermocouple tip adjacent the face of the downstream rotor disc. (A more detailed description, which is also the closest known prior art, will be discussed in the following description of the preferred embodiment).

The tube or conduit housing the thermocouple leads is tapered at an intermediate position to sealingly engage a similarly tapered aperture in the inner cylinder as biased by a coil spring. The tube also is divided into two sections (i.e. an upper and lower section) with the upper section extending into the probe head where the lead wires were connected to terminals on a ceramic board housed therein. The upper and lower sections preferably have adjacent ends disposed in a cavity defined by the flange member mounting the probe to the turbine cylinder. This cavity provides a space for coiling the lead wires to provide sufficient slack therein so that vibrations in the lower shaft and leads are not transmitted to the terminal or the ceramic board in the head. However, it has been found that the prior arrangement is cumbersome and has inherent assembly difficulties especially evident when the assembly is being mounted on the turbine cylinder. At times this results in the leads being made taut in the flange cavity, resulting in failures of the probe due to vibrational and other stress which the probe was not designed to encounter.

Further, in shipping and handling the prior assemblies, the lower shaft of the probe is sufficiently movable such that at times the weight of the shaft is supported by the thermocouple wires causing them to break.

SUMMARY OF THE INVENTION

The present invention provides an assembly of the above-mentioned parts wherein the adjacent spaced ends of both the upper and lower conduit tubes are retained within the flange cavity against any withdrawal therefrom to maintain a predetermined coiled or slack condition in the thermocouple wires in this space to isolate the ceramic board and the terminal connections from vibration and prevent the thermocouple wires from supporting the weight of any part of the assembly. This is accomplished by collar members attached to the tube ends internally of the flange cavity and the ends of each tube also containing an epoxy cement for securing the wires to each tube to prevent withdrawal of the wires thereby ensuring the slack condition will not be defeated during subsequent installation of the assembly.

BRIEF DESCRIPTION OF THE DRAWINGS

FIG. 1 is an elevational cross-sectional view of the prior art mounting of the temperature probe in a gas turbine engine; and, FIG. 2 is a view similar to FIG. 1 showing the assembly of the present invention.

DESCRIPTION OF THE PREFERRED EMBODIMENT

The prior art assembly, previously referred to, is shown in FIG. 1 and, with reference thereto, is seen to include a fabricated flange 2 comprising an external flange collar 3 having a central opening 4 with a plate 6 welded therein and a short nipple 8 welded to the plate 6 terminating thereabove in a cap 10 welded to the nipple to define a cavity 12 within the flange 2. The flange 2 in turn is attached to a turbine casing 14 in concentric relation with an opening 16 leading into the hot section of the turbine cylinder.

The thermocouple probe 18 includes a head 20 housing a ceramic terminal plate therein (not shown) and threadably attached to a fitting 22 which in turn is threadably received within the cap 10. An upper hollow tube 24 extends from within the flange cavity 12 through the cap 10 and fitting 22 and into the head providing a conduit for the thermocouple lead wires 26 leading to the ceramic terminal board for electrical connection therewith. A packing material surrounds the tube in the cap portion and when compressed against the tube by the threaded fitting retains the tube in the position shown against downward movement.

The probe also includes a lower hollow tube 28 extending inwardly from the flange cavity, through the turbine cylinder 14, then through an intermediate cylinder 30 separating the hot air from a cooled chamber 32, then through the blade ring 34 and the hollow vane 36 disposed thereon to ultimately pass through a 90° bend guide tube 38 secured to an inner seal ring 39 to position the probe tip 40 adjacent a next downstream disc 42 to sense the temperature of the disc cavity at this point.

It is noted that the tube 28 has a conical shaped intermediate portion 44 seated in a like conical shaped aperture 46 in the intermediate cylinder 30. Also, a collar member 48 is secured to the tube 28, as by welding, adjacent the turbine cylinder and a coil spring 50 is interposed between the collar 48 and plate to provide an inward biasing force resulting in a sealing engagement with the tube of the cylinder 30 at their complementary conical interface to prevent a leakage path from the hot section into the cool air chamber 32.

From this assembly it is seen that the welded flange requires the upper tube 24 and lower tube 28 with the collar 48 and spring 50 properly disposed thereon, to be inserted into the flange from the inner side as through the aperture 7 in the plate 6. The upper tube 24 will then be received in the fitting 22 and extend into the head 20 where upon tightening of the respective threads will hold the tube. However, as spring 50 has an extensible force, it tends to force the lower tube out of the flange cavity, and when assembling the flange with the probe mounted therein to the cylinder, the loose hanging lower tube presents an alignment problem for insertion into the inner apertures and tubes, and the assembly provides no means for easy manipulation of the lower tube into such proper position. Thus, it is not uncommon for the assembly to be modified during installation thereof to include a short threaded nipple welded to the cap 10 having such a length that the coiled slack in the cavity was removed. In this manner the lead wires would be pulled tightly against the force of the spring for making a generally solid seated engagement between the flange and the tube for easy manipulation of the lower tube. This placed an undesired strain on the thin lead wires 26 and further, in the ultimate assembly, permitted radial vibrational motion to be transmitted to the terminal connections in the head, occasionally causing the ceramic plate therein to fracture. Also, there existed the potential for removing sufficient inward travel from the spring to prevent the sealing engagement between the lower tube and the inner cylinder. Thus, as is evident, it was not uncommon for the thin wires to fail or the ceramic head to fracture or other defects to occur in the prior assembly.

Further, even without modification as above described, it was not uncommon to ship the probe to the field, attached to the flange, and during the course of being so shipped it was not uncommon for the wires to be subjected to the weight of the lower tube. This also tended to cause the thin lead wires to fail even before the probe could be assembled on the cylinder.

Reference is now made to FIG. 2 to show the assembly of the present invention to overcome the above deficiencies. As portions of the probe extending inwardly from the cylinder are the same as in FIG. 1, only the portion of the probe assembly within the flange cavity and the flange itself are shown. Thus, the flange 52 of the present invention comprises a standard weld neck flange having a unitary neck portion 54 and a central opening 56 therethrough. A cap 58 is welded to the upper end of the neck and has an aperture therethrough which in one end is sized so as to generally closely receive the upper hollow shaft 24 of the probe and enlarged and threaded at the opposed end for receipt of the fitting 22 which in turn threadably receives the probe head 20. A packing material is disposed in the aperture to prevent leakage to the exterior of the casing and retain the tube against any inward force. A collar member 60 is welded to the end of the shaft 24 disposed in the flange cavity to prevent outward withdrawal of the shaft 24. Also, the thermocouple lead wires are secured to the tube as by an epoxy 62 to prevent any displacement of the wire with respect to the tube.

The lower tube 28 likewise has a collar member 64 welded to the end thereof disposed in the flange cavity. A retaining plate 66 having a central aperture 68 sized so as to receive therethrough all parts of the lower tube except the collar 64 is secured to the inner face of the flange as by headed bolts countersunk therein and received in threaded apertures in the flange. The coil spring 50 is then inserted over the tube to seat against the inner face of the retaining plate, and collar 48 is then placed thereon and welded to the shaft 28 providing a biasing force to, in the assembly prior to installation on the turbine, seat the internal collar 64 against the inner face of the retaining plate.

A predetermined length of the probe lead wires are disposed between the opposed ends of the upper and lower tubes such that in their extreme separation within the cavity, there exists a coiled or slack condition. Thus, at all times prior to installation, the weight of the probe and any spring force will be transmitted to the collar 64 and will never be supported by the lead wires. Like the upper shaft, the lead wires are attached to the lower tube as by an epoxy to prevent any axial displacement that would cause the wires to become taut within the cavity.

In the position of the lower tube shown in FIG. 2, the collar is shown elevated from the retaining plate 66 and is thus in the position wherein the sealing engagement between the tube 28 and the internal cylinder displaces the tube upwardly against the biasing force of the coil spring. This displacement increases the slack of the wires within the cavity.

Thus, prior to installation of the assembly on the turbine, the sealing force of the spring causing the collar to engage the plate permits sufficient engagement such that manipulation of the flange provides corresponding manipulation of the lower tube of the probe for proper insertion into the internal apertures and guide tubes to readily permit proper installation. Also, the thermocouple wires within the assembly of the present invention are at all times slack within the flange cavity thereby preventing them from carrying any weight during shipping or installation, and also preventing any vibrational forces being transmitted through the wire to the ceramic plate in the head.

I claim:

1. A temperature probe assembly for a gas turbine engine having an outer casing housing the turbine and an internal casing through which the probe must extend, said assembly comprising:

a thermocouple tip for sensing the temperature of a critical region of the gas turbine interiorly of said internal casing and lead wires extending from said tip through apertures in said internal and outer casing, to a probe head exteriorly of said outer casing;

a flange member having an opening therethrough for alignment with said aperture in said outer casing;

a first tube member enclosing a length of said lead wires and extending through said casing apertures to within said opening in said flange;

a second tube member enclosing another length of the lead wires from within said opening in said flange to internally of said probe head;

an upper member covering the outer end of said flange opening, said member having an aperture generally smaller than said flange opening for receipt therethrough of said second tube;

a collar attached to said second tube member adjacent the end interiorly of said flange opening for preventing outward movement of said second tube beyond the engagement of said collar with said upper member;

means for mounting the probe head on said upper member and receiving said second tube therethrough;

a retaining plate removably attached to said flange member to cover the inner end of said opening and defining an aperture therethrough in alignment with said opening, said aperture being smaller than said opening but large enough for receipt of said first tube;

a collar member attached to said first tube adjacent the end thereof interiorly of said flange opening for preventing movement of said first tube outwardly of said opening beyond the engagement of said collar member with said retaining plate, whereby the maximum separation of the adjacent ends of said first and second tubes interiorly of said flange opening occurs when said collar member and collar abut said retaining plate and said upper member respectively; and, means externally of said flange opening for biasing said first tube outwardly of said opening to produce abutment of said collar member with said retaining plate, said lead wires having an excessive length forming a slack configuration in said flange opening when said tube ends are at their greatest separation whereby said wires remain free of any tensile stress or force transmitting condition.

2. A temperature probe assembly in accordance with claim 1 wherein the lead wires are securely attached to said tube at the ends thereof interiorly of said flange opening to prevent movement of said wires through said ends of said tubes.

3. A temperature probe assembly according to claim 2 wherein said external biasing means includes a coil spring disposed over said first tube having one end of said spring abutting the surface of the retaining plate facing the turbine casing and the opposite end abutting a spring retaining collar attached to said first tube inwardly of said retaining plate at a distance such that the spring normally biases said collar member within said opening into a semi-rigid engagement with said plate.

4. A temperature probe assembly comprising:
a thermocouple tip;
lead wires extending from said tip to a probe head for connection therein;
conduit means for enclosing said wires from said tip to said probe head, said means comprising;
means defining an elongated cavity closed at one end by a member having an aperture therethrough in alignment with said cavity said member providing means for supporting said probe head;
a first tube enclosing a length of said lead wires and extending from interiorly of said cavity through said aperture to within said head;
a first collar member securd to said first tube adjacent the end interiorly of said cavity, said collar member being larger than said aperture to prevent outward withdrawal of said first tube;
a removable retaining plate attached to said cavity defined means to cover the opposite ends of said cavity, said retaining plate having an aperture therein in alignment with said cavity;
a second tube enclosing a length of said lead wires and extending from interiorly of said cavity through said plate to said tip;
a second collar member securely attached to said second tube interiorly of said cavity, said second collar member being larger than the aperture in said plate to prevent withdrawal of said second tube through said plate;
biasing means externally of said cavity for resiliently urging said second collar member to abut the retaining plate within said cavity; and
wherein said lead wires are disposed in a slack configuration within said cavity so that any outward force on either of said tubes is not transmitted to said wires and wherein said biasing means permits relative movement of said second tube for proper disposition of said thermocouple tip.

5. An assembly according to claim 4 wherein the ends of said tubes interiorly of said cavity and the wires passing therethrough are respectively secured together to prevent withdrawal of the slack condition of the wires from the cavity through said tubes.

6. An assembly according to claim 5 wherein the biasing means comprises a coil spring disposed about said second tube and having one end abutting said retaining plate and another end abutting a spring retaining collar secured to said second tube so as to urge said second tube in a direction outwardly of said cavity.

7. Structure according to claim 6 wherein the force of said coil spring is sufficient to provide a semi-rigid abutment between said second collar and said retaining plate.

* * * * *